(12) United States Patent
Fujii et al.

(10) Patent No.: US 10,577,478 B2
(45) Date of Patent: Mar. 3, 2020

(54) POLYAMIDE MOULDING COMPOSITION AND MULTI-LAYERED STRUCTURE MADE THEREFROM

(71) Applicant: EMS-PATENT AG, Domat/Ems (CH)

(72) Inventors: Takamasa Fujii, Tokyo (JP); Naoyuki Sasaki, Tokyo (JP)

(73) Assignee: EMS-Patent AG, Domat/Ems (CH)

( * ) Notice: Subject to any disclaimer, the term of this patent is extended or adjusted under 35 U.S.C. 154(b) by 107 days.

(21) Appl. No.: 15/789,069

(22) Filed: Oct. 20, 2017

(65) Prior Publication Data

US 2018/0112059 A1   Apr. 26, 2018

(30) Foreign Application Priority Data

Oct. 21, 2016   (EP) .................................... 16195092

(51) Int. Cl.
| | |
|---|---|
| *C08K 5/01* | (2006.01) |
| *B29C 45/00* | (2006.01) |
| *C08K 5/24* | (2006.01) |
| *C08L 77/02* | (2006.01) |
| *C08L 77/06* | (2006.01) |

(52) U.S. Cl.
CPC ............ *C08K 5/01* (2013.01); *B29C 45/0001* (2013.01); *C08K 5/24* (2013.01); *C08L 77/02* (2013.01); *C08L 77/06* (2013.01)

(58) Field of Classification Search
CPC .. C08K 5/01; C08K 5/24; C08L 77/06; C08L 77/02; B29C 45/0001
USPC ....................................................... 428/474.4
See application file for complete search history.

(56) References Cited

U.S. PATENT DOCUMENTS

| | | | |
|---|---|---|---|
| 4,690,856 A | 9/1987 | Ito et al. | |
| 6,482,889 B1 | 11/2002 | Kurz | |
| 7,723,411 B2 | 5/2010 | Schneider | |
| 7,973,191 B2 | 7/2011 | Döring et al. | |
| 8,022,170 B2 | 9/2011 | Hoffman et al. | |
| 8,268,956 B2 | 9/2012 | Bühler et al. | |
| 8,383,244 B2 | 2/2013 | Bayer et al. | |
| 8,404,323 B2 | 3/2013 | Pfleghar et al. | |
| 8,586,662 B2 | 11/2013 | Harder et al. | |
| 8,604,120 B2 | 12/2013 | Stoppelmann et al. | |
| 8,993,662 B2 | 3/2015 | Harder | |
| 9,109,115 B2 | 8/2015 | Bühler | |
| 9,133,322 B2 | 9/2015 | Roth et al. | |
| 9,359,532 B2 | 6/2016 | Kaplan | |
| 9,453,106 B2 | 9/2016 | Bühler | |
| 9,644,081 B2 | 5/2017 | Aepli et al. | |
| 9,663,655 B2 | 5/2017 | Aepli et al. | |
| 9,815,967 B2 | 11/2017 | Harder et al. | |
| 9,963,547 B2 | 5/2018 | Hoppe et al. | |
| 9,963,591 B2 | 5/2018 | Bayer et al. | |
| 9,969,882 B2 | 5/2018 | Thomas et al. | |
| 10,144,805 B2 | 12/2018 | Bayer et al. | |
| 2006/0235190 A1 | 10/2006 | Hoffman et al. | |
| 2006/0264542 A1 | 11/2006 | Schneider | |
| 2008/0135720 A1 | 6/2008 | Bühler et al. | |
| 2008/0300347 A1 | 12/2008 | Kurz et al. | |
| 2010/0069657 A1 | 3/2010 | Döring et al. | |
| 2010/0168423 A1 | 7/2010 | Döring et al. | |
| 2010/0279111 A1 | 11/2010 | Harder et al. | |
| 2011/0220667 A1 | 9/2011 | Pfleghar et al. | |
| 2012/0029133 A1 | 2/2012 | Stöppelmann et al. | |
| 2012/0115993 A1 | 5/2012 | Kaplan | |
| 2012/0237708 A1 | 9/2012 | Caviezel et al. | |
| 2012/0321829 A1 | 12/2012 | Bayer et al. | |
| 2013/0317168 A1 | 11/2013 | Bühler | |
| 2014/0094548 A1 | 4/2014 | Roth et al. | |
| 2014/0135458 A1 | 5/2014 | Kaplan | |
| 2014/0171573 A1 | 6/2014 | Bayer et al. | |
| 2014/0272227 A1 | 9/2014 | Jeltsch et al. | |
| 2014/0275392 A1 | 9/2014 | Buhler | |
| 2015/0051343 A1 | 2/2015 | Kaplan | |
| 2015/0104638 A1 | 4/2015 | Jeltsch et al. | |
| 2015/0126635 A1 | 5/2015 | Liedloff et al. | |
| 2015/0126701 A1 | 5/2015 | Liedloff et al. | |
| 2015/0218374 A1 | 8/2015 | Thomas et al. | |
| 2015/0284531 A1 | 10/2015 | Aepli et al. | |
| 2015/0291795 A1 | 10/2015 | Aepli | |
| 2015/0352765 A1 | 12/2015 | Hoffmann et al. | |
| 2015/0368398 A1 | 12/2015 | Hoppe et al. | |
| 2016/0130439 A1 | 5/2016 | Koch et al. | |
| 2016/0280914 A1 | 9/2016 | Thomas et al. | |
| 2016/0297123 A1 | 10/2016 | Weis et al. | |
| 2016/0369098 A1 | 12/2016 | Yasuda et al. | |
| 2016/0376423 A1 | 12/2016 | Harder et al. | |
| 2017/0022349 A1 | 1/2017 | Mii et al. | |

(Continued)

FOREIGN PATENT DOCUMENTS

| | | |
|---|---|---|
| DE | 10 2014 004430 A1 | 10/2015 |
| DE | 10 2014 008815 A1 | 1/2016 |

(Continued)

OTHER PUBLICATIONS

Berneth, H., "Azine Dyes," *Ullmann's Encyclopedia of Industrial Chemistry*, (2005)—Table of contents only.

(Continued)

*Primary Examiner* — Hui H Chin

(74) *Attorney, Agent, or Firm* — Leydig, Voit & Mayer, Ltd.

(57) ABSTRACT

The present invention refers to a polyamide moulding composition having an excellent adhesion to metal surfaces. Moreover, the present invention refers to structural parts with a metal component directly bonded to a thermoplastic component (interconnected without using a bonding agent/ layer). The present invention also relates to a method for manufacturing of such structural parts by an injection moulding or extrusion processes.

14 Claims, No Drawings

(56) References Cited

U.S. PATENT DOCUMENTS

| | | |
|---|---|---|
| 2017/0037217 A1* | 2/2017 | Taketani ............... C08K 5/053 |
| 2017/0058123 A1 | 3/2017 | Sütterlin et al. |
| 2017/0107326 A1 | 4/2017 | Bayer et al. |
| 2017/0136668 A1 | 5/2017 | Kose et al. |
| 2017/0137608 A1 | 5/2017 | Stöppelmann |
| 2017/0137609 A1 | 5/2017 | Stöppelmann |
| 2017/0183140 A1 | 6/2017 | Sütterlin et al. |
| 2017/0225414 A1 | 8/2017 | Cheung |
| 2018/0022900 A1 | 1/2018 | Nakano et al. |
| 2018/0100064 A1 | 4/2018 | Aepli et al. |
| 2018/0112059 A1 | 4/2018 | Fujii et al. |
| 2018/0155545 A1 | 6/2018 | Stöppelmann et al. |
| 2018/0171141 A1 | 6/2018 | Thomas et al. |
| 2018/0251599 A1 | 9/2018 | Hoffmann et al. |
| 2018/0251600 A1 | 9/2018 | Aepli et al. |
| 2018/0298191 A1 | 10/2018 | Schubert et al. |

FOREIGN PATENT DOCUMENTS

| | | |
|---|---|---|
| EP | 0 370 342 A2 | 5/1990 |
| JP | 2016-108531 A | 6/2016 |
| WO | WO 2008/089873 A2 | 7/2008 |
| WO | WO 2015/159834 A1 | 10/2015 |

OTHER PUBLICATIONS

Thailand Department of Intellectual Property, First Office Action in Thai Patent Application No. 1701006181 (dated Nov. 3, 2018).

\* cited by examiner

POLYAMIDE MOULDING COMPOSITION AND MULTI-LAYERED STRUCTURE MADE THEREFROM

CROSS-REFERENCE TO A RELATED APPLICATION

This patent application claims the benefit of European Patent Application No. 16 195 092.2, filed on Oct. 21, 2016, the disclosure of which is incorporated herein by reference in its entirety for all purposes.

BACKGROUND OF THE INVENTION

The present invention refers to a polyamide moulding composition having an excellent adhesion to metal surfaces. Moreover, the present invention refers to structural parts with a metal component directly bonded to a thermoplastic component (interconnected without using a bonding agent/layer). The present invention also relates to a method for manufacturing of such structural parts by an injection moulding or extrusion processes.

Metal/plastic composite parts combine the respective positive properties of the components metal and plastics in one part. Parts of two different components, metal and plastics, are here referred to as "hybrid" parts. The properties and working behavior of metals and plastics, however, greatly vary and can therefore not be easily interconnected such that a permanent and loadable connection is obtained.

From EP 0 370 342 A2 a composite part is known in which reinforcing ribs of plastics are injected to a basic body of metal. The metal basic body comprises openings through which the plastics are injected. This means that this is a positive connection where the plastics are anchored in the metal. Alternatively a positive connection can be achieved by bead-locking of the metal component. Such positive connections are not satisfactory for loaded parts with respect to their bond strength. Moreover, the parts are corrodible as moisture can penetrate between the metal component and the plastic component due to capillary action.

In order to improve the adhesion between a metal surface and a polymer DE 10 2014 008 815 A1 proposes the roughening of the metal surface by pulse laser irradiation. The microscopic undercuts generated in this way can be partially filled by a polymer during the following injection moulding process. But the pretreatment of the metal is time-consuming and only low molecular weight polymers are able to successfully infiltrate the microscopic undercuts.

Because only a few polymers are suitable for direct bonding to unmodified metal surfaces WO 2008/089873 A2 proposes to introduce an adhesion layer between polymer and metal layer. After the adhesion layer is applied to the metal surface the polymer layer is heat-fusion-bonded to the adhesion layer forming a three-layer composite.

U.S. Pat. No. 4,690,856 describes laminates consisting of a metal layer and a layer made from a polyamide adhesive composition having high peel strength. The adhesive composition comprises a polyamide, a modified polyolefin and an aminosilane compound and is provided as sheet. The polyamide-polyolefin core layer is heat-fusion-bonded to the metal layer by press forming or continuous forming using a roll.

DE 10 2014 004 430 A1 refers to a method for the lamination of a metal surface with a self-adherent polymer comprising a functional group selected from a acid or silane compound by injection moulding or extrusion processes.

WO 2015/159834 A1 refers to a semi-aromatic polyamide resin composition which contains a semi-aromatic polyamide and a polyhydric alcohol, and which is characterized in that the mass ratio of the semi-aromatic polyamide to the polyhydric alcohol is from 99.95/0.05 to 90/10 and that the semi-aromatic polyamide has a melting point of 300-350° C. The addition of polyhydric alcohol improves the heat and hydrolytic resistance as well as the flowability of such compositions. The document is silent about the adhesion behavior of such a polyamide composition in combination with metals.

JP 2016-108531 refers to fluorene compounds to improve the bonding between reinforcing fibers and thermoplastic polymer matrices. The examples show that the modulus and tensile strength of the polymer compositions on base of polyphenylensulfide and carbon fibers can be improved by using bis(phenoxyethanol)fluorene.

In case of structural parts, in particular supporting parts, movable parts and/or security- or safety-relevant parts of a vehicle, an item of equipment or any other device demands on strength and reliability of the connection of metal and plastics have to be made which cannot be met by the prior art. However, a still not-solved drawback of fiber reinforced polyamide moulding compositions mentioned above is that the adhesion to metals is not sufficient.

SUMMARY OF THE INVENTION

It is therefore the object of the present invention to provide a polyamide composition having an improved adhesion to metal surfaces as well as structural parts with a metal component (also called substrate) and a thermoplastic component which are permanently and loadably connected to each other. In particular the tensile lap-shear strength according to ISO 19095 (2015-08) determined on a type B specimen is at least 35 MPa, preferably at least 40 MPa.

In addition, the polyamide moulding compositions should exhibit good heat resistance, excellent mechanical and thermal properties, in particular a high tensile strength and a high deflection temperature under load. The moulded articles produced from these compositions should exhibit a smooth surface.

It is furthermore the object of the present invention to provide multilayer structures or structural parts that exhibit a strong adhesion of a polyamide moulding composition to the substrate. Furthermore these parts should show high flexural strength and stiffness against torsion, preferably even at high temperature.

It is moreover the object of the present invention to provide structural parts that can be employed in areas in which the requirements as far as shear strength requirement are concerned are challenging and/or areas which are subject to corrosion.

This problem is solved by the features of the polyamide moulding composition and the moulded article described herein, as well as the multi-layered structure described herein and the methods described herein for producing a multi-layered part according to the invention, and the advantageous developments thereof.

DETAILED DESCRIPTION OF THE INVENTION

The present invention provides a thermoplastic polyamide moulding composition which consists of the following components:

(A) 25 to 99.3% by weight of at least one polyamide;
(B) 0.5 to 15% by weight of at least one fluorene compound having preferably at least one hydroxyl group;
(C) 0.2 to 3.0% by weight of at least one azine compound, especially at least one nigrosine;
(D) 0 to 70% by weight of at least one filler;
(E) 0 to 15.0% by weight of at least one further additive, different from (B), (C) and (D);

whereby the entirety of components (A) to (E) adds up to 100% by weight. That is, the composition according to the present invention does not contain any different components besides the above listed components (A) to (E).

The polyamide composition comprises a thermoplastic polyamide, an azine compound and a fluorene compound. It has been established that the polyamide moulding composition according to the present invention exhibits a hitherto unachieved bond strength by a material connection, especially between metal and thermoplastic polyamide moulding compositions, comprising or consisting of this polyamide composition.

Surprisingly it was established by the inventors that the polyamide moulding compositions according to the invention have an excellent adhesion to metals, especially aluminium, and allow the production of structural parts comprising a metal component (substrate) and a thermoplastic component, which are light, stiff, reliable, heat-resistant and have a high tensile lap-shear strength according to ISO 19095-1:2015. Moreover the composition shows a good processability, in particular an excellent flowability, and results in smooth surfaces.

When compounded with metal parts, the polyamide moulding compositions according to the present invention eliminate the need to adapt the metal part either chemically (e.g. application of adhesive layers) or mechanically (e.g. undercuts or mechanical anchorage) in order to ensure a stable and lasting compound with the metal part.

Depending on the application temperature range and depending on the mechanical demands, the plastic component can also contain fiber reinforcement and/or particulate fillers and further additives.

In the following preferred embodiments of the essential components of the polyamide moulding composition according to the invention will be discussed in greater detail.

Polyamide (A)

The term "polyamide" as used in the context of the present invention is a generic term, which comprises both homopolyamides and copolyamides. The abbreviated polyamide nomenclature conforms to the norm ISO 16396-1 (2015-04).

In a preferred embodiment, the moulding composition comprises the at least one polyamide (A), which could be any of the polyamides (A1) to (A4) or a combination thereof, in an amount of 30.0 to 98.7% by weight, more preferably 35.0 to 98.3 or 98.2% by weight, more preferably 30.0 to 78.7 or 83.7% by weight, more preferably 35 to 73.3% by weight, each in relation to the sum of the components (A) to (E).

The polyamide (A) is preferably selected from the group consisting of partially crystalline aliphatic polyamides (A1), partially crystalline partially aromatic polyamides (A2), amorphous or microcrystalline cycloaliphatic polyamides (A3) and amorphous partially aromatic polyamides (A4). All polyamides (A1) to (A4) contribute to the total content of the at least one polyamide (A), as described above.

Most preferred are the polyamide types (A1) and (A2) and mixtures of (A1) or (A2) with at least one of the polyamides (A3) and (A4).

Component (A1)—Partially Crystalline Aliphatic Polyamide

Polyamide (A) preferably is selected from the group consisting of partially crystalline aliphatic polyamides (A1), based on aliphatic or araliphatic diamines and aliphatic dicarboxylic acids, aliphatic aminocarboxylic acids or lactams. In connection with polyamide (A1) the term aliphatic includes aliphatic structural units with an open-chain structure, straight or branched, saturated or unsaturated and excludes cycloaliphatic structural units with a cyclic or ring structure. An araliphatic diamine is a compound comprising an aromatic structure and two primary amino groups attached to an aliphatic structural unit, for example an alkylene structure.

Polyamides of component (A1) are characterized in that the melting enthalpy determined according to DIN EN ISO 11357-3 (2013-04) with a heating rate of 20 K/min is at least 25 J/g, preferably in the range of 30 to 70 J/g.

Furthermore the partially crystalline aliphatic polyamide (A1) preferably has a melting point in the range of 160 to 300° C., preferred of 175 to 295° C., more preferred in the range of 220 to 270° C., measured according to DIN EN ISO 11357-3 (2013-04) with a heating rate of 20 K/min.

Polyamide (A1) is preferably selected from the group consisting of PA 46, PA 56, PA 6, PA 66, PA 6/66, PA 69, PA 610, PA 612, PA 614, PA 1010, PA 1012, PA 1014, PA 1212, PA 11, PA 12, PA 6/12, PA MXD6, PA MXD10 and also copolymers and mixtures thereof. In particular polyamide (A1) is PA 6, PA 66, PA610 or PA 612 and also copolymers and mixtures thereof.

The partially crystalline aliphatic polyamide (A1) preferably has a solution viscosity $\eta_{rel}$ measured according to DIN EN ISO 307:2013-08 on solutions of 0.5 g polymer in 100 mL m-cresol at a temperature of 20° C., of a maximum of 2.60, preferably a maximum of 2.3, especially a maximum of 2.0. Especially preferred polyamides (A) have a solution viscosity $\eta_{rel}$ in the range from 1.4-2.3, further preferred in the range from 1.45-2.00, further preferred in the range from 1.50-1.90 and especially from 1.55 to 1.85.

Component (A2)—Partially Crystalline Partially Aromatic Polyamides (A2)

In a further embodiment polyamide (A) preferably is selected from the group consisting of partially crystalline partially aromatic polyamides (A2), based on aliphatic or araliphatic diamines and aromatic dicarboxylic acids, whereby a part of the aromatic dicarboxylic acids can be replaced by aliphatic or cycloaliphatic dicarboxylic acids. Preferably not more than 50 mol-% of the total dicarboxylic acids content of polyamide (A2) are aliphatic dicarboxylic acids.

Polyamides of component (A2) are characterized in that the melting enthalpy determined according to DIN EN ISO 11357-3 (2013-04) with a heating rate of 20 K/min is at least 20 J/g, preferably in the range of 20 to 70 J/g. Furthermore the partially crystalline aliphatic polyamide (A2) preferably has a melting point in the range of 240 to 340° C., preferred of 260 to 330° C., more preferred of 270 to 325° C., measured according to DIN EN ISO 11357-3 (2013-04) with a heating rate of 20 K/min.

Preferred partially aromatic partially crystalline polyamides (A2) are prepared from a) 50-100 mol % terephthalic acid and/or a naphthalene dicarboxylic acid, in particular naphthalene-2,6-dicarboxylic acid, and 0-50 mol %, of at least one aliphatic dicarboxylic acid having 6-12 carbon atoms, and/or 0-50 mol % of at least one cycloaliphatic dicarboxylic acid having 8-20 carbon atoms, and/or 0-50 mol % isophthalic acid, with respect to the total amount of the dicarboxylic acids b) 80-100 mol % of at least one linear or branched aliphatic diamine having 4-18 carbon atoms, preferably 6-12 carbons, and 0-20 mol % of at least one cycloaliphatic diamine, preferably one having 6-20 carbons, such as PACM (4,4'-bis(aminodicyclo-hexyl)methane), MACM (3,3'-dimethyl-4,4'-bis(aminodicyclohexyl)methane), BAC (1,3-bis (aminomethyl)-cyclohexan) and/or IPDA (3-aminomethyl-3,5,5-trimethylcyclohexylamine) and/or 0-20 mol % of at least one araliphatic diamine such as MXDA (meta-xylylendiamine), and PXDA (para-xylylendiamine), with respect to the total amount of the diamines, and optionally c) aminocarboxylic acids and/or lactams, each having 6-12 carbon atoms.

Moreover, it is preferable that the said aromatic dicarboxylic acids of the partially aromatic polyamide of component (A) be chosen from the group: terephthalic acid, isophthalic acid, and mixtures thereof.

According to another preferred embodiment said, e.g., aliphatic dicarboxylic acids of the partially aromatic polyamide of component (A) that can be used besides terephthalic acid are chosen from the group: adipic acid, suberic acid, azelaic acid, sebacic acid, undecanedioic acid, dodecanedioic acid, brassylic acid, tetradecanedioic acid, pentadecanedioic acid, hexadecanedioic acid, octadecanedioic acid and dimeric fatty acid (C36). Among the dicarboxylic acids, adipic acid, sebacic acid, dodecanedioic acid, isophthalic acid or a mixture of such dicarboxylic acids, especially adipic acid and isophthalic acid, and especially adipic acid alone are preferred.

According to another preferred embodiment, said aliphatic diamines of the partially aromatic polyamide of component (A) are chosen from the group: 1,4-butanediamine, 1,5-pentanediamine, 2-methyl-1,5-pentanediamine, 1,6-hexanediamine, 2,2,4-trimethyl-1,6-hexanediamine, 2,4,4-trimethyl-1,6-hexanediamine, 1,7-heptanediamine, 1,8-octanediamine, 1,9-nonanediamine, methyl-1,8-octanediamine, 1,10-decandiamine, 1,11-undecanediamine, 1,12-dodecanediamine, or a mixture of such diamines, where 1,6-hexanediamine, 1,10-decanediamine, 1,12-dodecanediamine, where a mixture of such diamines is preferred, where I,6-hexanediamine and 1,10-decanediamine are especially preferred. In addition to said diamines, cycloaliphatic and/or araliphatic diamines can be used in a concentration of 0-20 mol % with respect to the total amount of diamines.

Especially preferably, the polyamides (A2) are formed from the following components:

(A2a) Dicarboxylic Acids:

50-100 mol-% aromatic terephthalic acid and/or naphthalene dicarboxylic acid, with respect to the total content of dicarboxylic acids that are present, 0-50 mol % of an aliphatic dicarboxylic acid, preferably having 6-12 carbon atoms, and/or a cycloaliphatic dicarboxylic acid having preferably 8-20 carbon atoms, and/or isophthalic acid;

(A2b) Diamines:

80-100 mol % of at least one linear or branched aliphatic diamine having 4-18 carbon atoms, preferably 6-12 carbon atoms with respect to the total content of diamines that are present, 0-20 mol % cycloaliphatic diamines, preferably having 6-20 carbon atoms, most preferred are PACM, MACM and IPDA, and/or araliphatic diamines such as MXDA and PXDA, whereby the molar percentage of dicarboxylic acids in the high melting polyamides is 100% and the molar percentage of diamines makes up 100%, and optionally of (A2c) Aminocarboxylic acids and/or lactams, containing lactams having preferably 6-12 carbon atoms and/or aminocarboxylic acids having preferably 6-12 carbon atoms.

While the components (A2a) and (A2b) are largely used in equimolar amounts, the concentration of (A2c) is a maximum of 20 wt.-%, preferably a maximum of 15 wt.-%, especially a maximum of 12 wt.-%, in each case with respect to the sum of (A2a) to (A2c). In a most preferred embodiment component (A2) is free of any aminocarboxylic acids and/or lactams.

In addition to the components (A2a) and (A2b), which are used in largely equimolar amounts, dicarboxylic acids (A2a) or diamines (A2b) can be used to regulate the molecular weight or to compensate monomer losses in production of the polyamide, so that the concentration of one component (A2a) or (A2b) can predominate in its totality.

Suitable cycloaliphatic dicarboxylic acids are the cis- and/or trans-cyclohexane-1,4-dicarboxylic acid and/or cis- and/or trans-cyclohexane-1,3-dicarboxylic acid (CHDA).

The obligatorily used aliphatic diamines indicated above can be replaced by other diamines in a lesser amount of no more than 20 mol %, preferably no more than 15 mol %, and especially no more than 10 mol %, with respect to the total amount of diamines. For example, cyclohexane-1,3-diamine, cyclohexane-1,4-diamine, 1,3-bis(aminomethyl)cyclohexane (BAC), isophoronediamine (IPDA), norbornanedimethylamine, 4,4'-diaminodicyclohexylmethane (PACM), 2,2'-(4,4'-diaminodicyclohexyl)propane (PACP) and 3,3'-dimethyl-4,4'-diaminodicyclohexylmethane (MACM) can be used as cycloaliphatic diamines. As araliphatic diamines, m-xylylenediamine (MXDA) and p-xylylenediamine (PXDA) may be mentioned. In a most preferred embodiment component (A) is free of any cycloaliphatic or any araliphatic diamines.

In addition to the described dicarboxylic acids and diamines, lactams and/or aminocarboxylic acids can also be used as polyamide-forming components (component (A2c)). Suitable compounds are, for example, caprolactam (CL), α,ω-aminocaproic acid, α,ω-aminononanoic acid, α,ω-aminoundecanoic acid (AUA), lauryllactam (LL) and α,ω-aminododecanoic acid (ADA). The concentration of the aminocarboxylic acids and/or lactams that are used together with the components (A2a) and (A2b) amount to a maximum of 20 wt.-%, preferably a maximum of 15 wt.-%, and especially preferably a maximum of 12 wt.-%, with respect to the sum of the components (A2a) through (A2c). Especially preferred are lactams or α,ω-amino acids having 4, 6, 7, 8, 11 or 12 carbon atoms. These are the lactams pyrrolidin-2-one (4 C atoms), ε-caprolactam (6 C atoms), enanthlactam (7 C atoms), capryllactam (8 C atoms), lauryllactam (12 C atoms) or the α,ω-amino acids 1,4-aminobutanoic acid, 1,6-aminohexanoic acid, 1,7-aminoheptanoic acid, 1,8-aminooctanoic acid, 1,11-aminoundecanoic acid, and 1,12-aminododecanoic acid.

In an especially preferred embodiment, component A2 is free of a lactam or aminocarboxylic acid and additionally free of a cycloaliphatic or an araliphatic diamines.

Specific representatives of the polyamides (A) in accordance with the invention are: PA 4T/4I, PA 4T/6I, PA 5T/5I, PA 6T/6, PA 6T/6I, PA 6T/6I/6, PA 6T/6I/66, PA 6T/6I/610, PA 6T/6I/612, PA 6T/66, 6T/610, 6T/612, PA 6T/10T, PA 6T/10I, PA 9T, PA 9MT (M=methyloctanediamine), PA 10T, PA 12T, PA 10T/10I, PA 10T/106, PA 10T/12, PA 10T/11, PA 6T/9T, PA 6T/12T, PA 6T/10T/6I, PA 6T/6I/6, PA 6T/6I/12, and mixtures thereof; especially preferably, the partially aromatic polyamide of component (A) is chosen from the group: PA 6T/6I, PA 6T/6I/66, PA 6T/6I/610, PA 6T/6I/612, or PA 6T/6I/X whereby X can be an aliphatic unit selected from the group consisting of 66, 610 or 612 or a combination thereof, and mixtures thereof. Regarding the polyamides PA 6T/6I/X the ones are especially preferred, which have a content of the aliphatic polyamide units X in the range of 5 to 20 mol-% and a content of the unit polyamide 6I in the range of 20 to 35 mol-%.

Therefore in accordance with the invention the following partially aromatic copolyamides are especially preferred as polyamides (A2):

a partially crystalline polyamide 6T/6I having 50-80 mol %, preferably 57-73 mol %, more preferably 62-72 mol % hexamethyleneterephthalamide units and 20-50 mol %, preferably 27-43 mol %, more preferably 28-38 mol % hexamethyleneisophthalamide units;

a partially crystalline polyamide 6T/66 having 50-65 mol %, preferably 52-62 mol %, more preferably 53-58, especially preferably 54-57 mol % hexamethyleneterephthalamide units and 35-50 mol %, preferably 38-48, more preferably 42-47, especially preferably 43-46 mol % hexamethyleneadipamide units;

a partially crystalline polyamide 6T/6I/612/X having 60-75 wt.-% hexamethyleneterephthalamide units (6T), 20-35 wt.-% hexamethyleneisophthalamide units (6I), 3-15 wt.-% hexamethylenedodecanamide units (612) and 0-5 wt.-% units X selected from the following units 66, 68, 69, 610, 6 or a mixture of these units, whereby the sum of the components is 100 wt.-% of the polyamid 6T/6I/612/X;

a partially crystalline polyamide 6T/6I/X having 60-75 wt.-% hexamethyleneterephthalamide units (6T), 20-35 wt.-% hexamethyleneisophthalamide units (6I), 5-20 wt.-% units X selected from the following units 66, 68, 69, 610, 612, 6 or a mixture of these units, whereby the sum of the components is 100 wt.-% of the polyamid 6T/6I/X.

a partially crystalline polyamide prepared from at least 50 mol %, preferably at least 70 mol % terephthalic acid and a maximum of 50 mol %, preferably at most 30 mol % isophthalic acid and a mixture of at least two diamines chosen from the group 1,6-diaminohexane, 1,9-nonanediamine, methyl1,8-octanediamine, and 1,10-decanediamine; wherein a partially crystalline polyamide prepared from at least 70 mol % terephthalic acid and a maximum of 30 mol % isophthalic acid and a mixture of 1,6-diaminohexane and 1,10-decanediamine is especially preferred;

a partially crystalline polyamide prepared from at least 50 mol % terephthalic acid and a maximum of 50 mol % dodecanedioic acid and a mixture of at least two diamines chosen from the group 1,6-diaminohexane, 1,9-nonanediamine, methyl-1,8-octanediamine and 1,10-decanediamine;

a partially crystalline polyamide 6T/10T having 10-60 mol %, preferably 10-40 mol %, hexamethyleneterephthalamide (6T) and 40-90 mol %, preferably 60-90 mol % decamethyleneterephthalamide (10T) units;

a partially crystalline polyamide 6T/10T/6I having 50-90 mol %, preferably 50-70 mol %, hexamethyleneterephthalamide units (6T), and 5-45 mol %, preferably 10-30 mol %, hexamethyleneterephthalamide units (6I), and 5-45 mol %, preferably 20-40 mol % decamethyleneterephthalamide (10T) units;

a partially crystalline polyamide 6T/6I/6 having 60-85 mol % hexamethyleneterephthalamide units (6T), and 15-40 mol % hexamethyleneisophthalamide units (6I), which additionally contains 5-15 wt.-% caprolactam.

The partially aromatic, partially crystalline polyamide (A2) preferably has a solution viscosity $\eta_{rel}$ measured according to DIN EN ISO 307:2013-08 on solutions of 0.5 g polymer in 100 mL m-cresol at a temperature of 20° C., of a maximum of 2.60, preferably a maximum of 2.3, especially a maximum of 2.0. Polyamides (A2) having a solution viscosity $\eta_{rel}$ in the range from 1.4-2.3, further preferred in the range from 1.45-2.00, further preferred in the range from 1.50-1.90 and especially from 1.55 to 1.85 are especially preferred.

The polyamides (A2) in accordance with the invention can be prepared in conventional polycondensation equipment via the process sequence precondensate and postcondensation. The described chain length regulators are preferably used for the polycondensation to regulate the viscosity. In addition, the viscosity can be established through the use of an excess of diamine or diacid.

Especially the partially crystalline polyamide 6T/6I (70:30) is made from 1,6-diaminohexane as the only diamine, terephthalic acid and isophthalic acid in a molar ratio of 70:30. The melting point of this partially crystalline polyamide is 325° C.

The partially crystalline polyamide 10T/6T is made from 1,10-decanediamine, 1,6-diaminohexane and terephthalic acid whereby the a molar ratio of 1,10-decanediamine to 1,6-diaminohexane is in the range of 95-40:5-60, in particular 90-75:10-25.

The partially crystalline polyamide 10T/6T/10I/6I, is made from 1,10-decanediamine, 1,6-diaminohexane, terephthalic acid and isophthalic acid with an amount of 1,10-decanediamine of 7.5 to 20 mol-%, an amount of 1,6-diaminohexane of 30 to 42.5 mol-%, an amount of terephthalic acid of 36 to 49.15 mol-% and an amount of isophthalic acid of 0.85 to 14 mol-%, whereas the amounts of the four monomers add up to 100 mol-% and the amounts of the diamines add up to 50 mol-% and the amounts of the dicarboxylic acids add up to 50 mol-%.

The partially crystalline polyamide 6T/6I/612 is made from 60-75 wt.-% 6T-units, composed by 1,6-hexanediamine and terephthalic acid, 20-35 wt.-% 6I-units, composed by 1,6-hexandiamine and isophthalic acid, and 3-15 wt.-% 612-units, composed by 1,6-hexanediamine and dodecandioic acid.

The diamine 2-methyl-1,5-pentanediamine is abbreviated as MPMD. The diamine 2-methyl-1,8-octanediamine is abbreviated as MOD.

Component (A3)—Cycloaliphatic Polyamides

The polyamides (A3) comprise at least one cycloaliphatic diamine or cycloaliphatic dicarboxylic acid and can further comprise aliphatic (open-chain) or aromatic monomers.

Preferably, component (A3) contains or consists of amorphous or microcrystalline polyamides based on cycloaliphatic diamines, which have a glass transition temperature, determined in accordance with ISO 11357-2 (2013-04) by means of differential scanning calorimetry (DSC) with a heating rate of 20° C./min, of at least 100° C., preferably of at least 120 or 130° C., and particularly preferably of at least 140 or 150° C., but preferably of no more than 230° C. or no more than 210° C.

Here, both the amorphous and the microcrystalline polyamides are transparent in the wavelength range visible for the human eye, in particular provided they are not (yet) mixed with pigments. In this case, "transparent" means that moulded parts formed from the polyamides A3 alone have a high light transmission (LT) of at least 85, preferably at 88% and in particular of more than 90%. The light transmission value, which is used as a measure for transparency, is always to be understood here within the scope of the present application as being specified in accordance with the ASTM D 1003 method (light type CIE-C). Here, the light transmission was measured in the experiments detailed below using a device with the name Haze Guard Plus by BYK Gardner on round plates 70×2 mm or plates measuring 60×60×2 mm in size. The transmission value is specified for the visible wavelength range defined in accordance with CIE-C, that is to say with basic intensities approximately between 400 and 770 mm. The round plates 70×2 mm are produced for example for this purpose using an Arburg injection moulding machine in a polished mould, wherein the cylinder temperature is between 200° C. and 340° C. and the mould temperature is between 20° C. and 140° C.

The amorphous polyamides preferably have no measurable heat of fusion or only very low heat of fusion (enthalpy of fusion) of at most 4 J/g, preferably of at most 2 J/g (determined in accordance with ISO 11357-3 (2013-04) on the granulate, differential scanning calorimetry (DSC) with a heating rate of 20° C./min). The microcrystalline polyamides (A3) have small crystallites, which do not significantly scatter the visible light, and have a moderate heat of fusion in the range of 4-25 J/g, preferably in the range of 8-22 J/g (determined in accordance with ISO 11357-3 (2013-04) on the granulate, differential scanning calorimetry (DSC) with a heating rate of 20° C./min).

The concentration of the cycloaliphatic diamine or cycloaliphatic dicarboxylic acid contained in component (A3) is preferably at least 20 mol %, in particular at least 40 mol % and particularly preferably at least 50 or 60 mol %, based on the sum of all diamines or dicarboxylic acid contained in (A3). A concentration of the cycloaliphatic diamines or cycloaliphatic dicarboxylic acid in the range of 60 to 100 mol %, based on the sum of all diamines or dicarboxylic acids of component (A3), is particularly preferred. Most preferred are polyamides (A3) comprising 60 to 100 mol % cycloaliphatic diamines, based on the sum of all diamines, and which are free of cycloaliphatic dicarboxylic acids.

With regard to component (A3), suitable cycloaliphatic diamines are those comprising 6 to 24 carbon atoms, such as bis-(4-amino-3-methyl-cyclohexyl)-methane (MACM), bis-(4-amino-cyclohexyl)-methane (PACM), bis-(4-amino-3-ethyl-cyclohexyl)-methane (EACM), bis-(4-amino-3,5-dimethyl-cyclohexyl)-methane (TMDC), 2,6-norbornanediamine or 2,6-bis-(aminomethyl)-norbornane or 1,3-diaminocyclohexane, 1,4-diaminocyclohexanediamine, isophoronediamine, 1,3-bis-(aminomethyl)cyclohexane, 1,4-bis-(aminomethyl)cyclohexane, 2,2-(4,4'-diaminodicyclohexyl)propane (PACP), or mixtures thereof. In particular, alkyl-substituted bis-(aminocyclohexyl) methane or bis(aminocyclohexyl)propane is preferred. Linear and/or branched C1-C6, preferably C1-C4 alkyl groups are preferred as alkyl substituents, therefore in particular methyl groups, ethyl groups, propyl groups, isopropyl or butyl groups, with methyl groups being preferred in particular. Bis-(4-amino-3-methyl-cyclohexyl)-methane (MACM) and bis-(4-amino-3,5-dimethyl-cyclohexyl)-methane (TMDC) are used as alkyl-substituted bis(aminocyclohexyl)-methane in a particularly preferred embodiment. The cycloaliphatic diamines PACM, MACM and TMDC are particularly preferred.

Besides the cycloaliphatic diamines, other aliphatic and aromatic diamines can also be used, within a limited scope, to form the polyamides (A3), for example 1,4-butanediamine, 1,5-pentanediamine, 2-methyl-1,5-pentanediamine, 2-butyl-2-ethyl-1,5-pentanediamine, 1,6-hexanediamine, 2,2,4-trimethylhexamethylenediamine, 2,4,4-trimethylhexamethylenediamine, 1,8-octanediamine, 2-methyl-1,8-octanediamine, 1,9-nonanediamine, 1,10-decanediamine, 1,11-undecanediamine, 1,12-dodecanediamine, 1,13-tridecanediamine, 1,14-tetradecanediamine, m-xylylenediamine and p-xylylenediamine.

Straight-chain aliphatic diamines comprising 6-10 carbon atoms, in particular 1,6-hexanediamine, are preferred. These other diamines within the component (A3) do not make up more than 80 mol % of the totality of diamines in component (A3) however, and preferably make up no more than 60 mol %, particularly preferably no more than 40 mol % of the totality of diamines in component (A2). The component (A2) is particularly preferably substantially free from such further other diamines that are not cycloaliphatic.

Dicarboxylic acids suitable for the polyamide (A3) are: adipic acid, suberic acid, azelaic acid, sebacic acid, undecane diacid, dodecane diacid, tridecane diacid, tetradecane diacid, pentadecane diacid, hexadecane diacid, heptadecane diacid, octadecane diacid, C36-dimer fatty acid, isophthalic acid, terephthalic acid, naphthalene dicarboxylic acid, cis- and/or trans-cyclohexane-1,4-dicarboxylic acid and/or cis- and/or trans-cyolohexane-1,3-dicarboxylic acid (CHDA), and mixtures thereof. Aromatic dicarboxylic acids and straight-chain aliphatic dicarboxylic acids are preferred. The dicarboxylic acids terephthalic acid, isophthalic acid, sebacic acid and dodecane diacid are particularly preferred.

The polyamides (A3) may also contain lactams or amino carboxylic acids, in particular α,ω-amino acids or lactams comprising 6 to 12 carbon atoms, as further monomers, wherein the following selection is mentioned by way of example: m-aminobenzoic acid, p-aminobenzoic acid, caprolactam (CL), α,ω-aminocaproic acid, α,ω-aminoheptanoic acid, α,ω-aminoctanoic acid, α,ω-aminononanoic acid, α,ω-aminodecanoic acid, α,ω-aminoundecanoic acid (AUA), laurolactam (LL) and α,ω-aminododecanoic acid (ADA). Caprolactam, α,ω-aminocaproic acid, laurolactam, α,ω-aminoundecanoic acid and α,ω-aminododecanoic acid are particularly preferred. The proportion of lactams or amino acids in component (A3) is 0 to 45 mol %, preferably 2-40 mol % and particularly preferably 3 to 35 mol %, in each case based on the sum of all monomers forming (A3), wherein the concentration of the cycloaliphatic diamine is always at least 20 mol %.

Preferred polyamides (A3) based on cycloaliphatic diamines are MACM9, MACM10, MACM11, MACM12, MACM13, MACM14, MACM16, MACM18, PACM9, PACM10, PACM11, PACM12, PACM13, PACM14, PACM16, PACM18, TMDC9, TMDC10, TMDC11, TMDC12, TMDC13, TMDC14, TMDC15, TMDC16, TMDC17, TMDC18 or copolyamides, such as MACMI/12, MACMT/12, MACMI/MACMT/12, 6I/6T/MACMI/MACMT/12, 3-6T (3-6=trimethylhexamethylene-1,6-diamine), 6I/MACMI/MACMT, 6I/PACMI/PACMT, 6I/6T/MACMI, MACMI/MACM36, 12/PACMI or 12/MACMT, 6/PACMT, 6/IPDT or mixtures thereof MACM9-18/PACM9-18, MACM9-18/TMDC9-18, TMDC9-18/PACM9-18, in particular MACM10/PACM10, MACM12/PACM12 and MACM14/PACM14, and mixtures thereof.

Component (A4)—Amorphous Partially Aromatic Polyamides

Polyamides (A4) are characterized in that the melting enthalpy determined according to DIN EN ISO 11357-3 (2013) with a heating rate of 20 K/min is less than 8 J/g, preferably less than 5 J/g.

Furthermore the amorphous partially aromatic polyamides (A4) preferably has a glass transition temperature in the range of 90 to 250° C., preferred of 110 to 220° C., more preferred in the range of 115 to 200° C., measured according to DIN EN ISO 11357-2 (2013-04) with a heating rate of 20 K/min.

Polyamide (A4) is preferably selected from the group consisting of PA 5I, PA 6I, PA DI (D=2-methyl-1,5-pentandiamine), PA 5I/5T, PA DI/DT, PA 6T/6I, PA5I/5T/6I/6T, PA 5I/5T/DI/DT, PA6I/6T/DI/DT, PA 6I/10I, PA 10I/10T, PA MXDI, PA MXD6/MXDI and also copolymers and mixtures thereof. In particular PA 5I/5T, PA DI/DT or PA 6T/6I are preferably used as polyamide (A4). In case that the polyamide (A4) is derived from isophthalic and terephthalic acid, it is preferred that the molar ratio of isophthalic acid:terephthalic acid is 51 to 100:49 to 0 (mol-%), most preferred 60 to 80:40 to 20 (mol-%), whereby a ratio of I/(I+T)=100 mol-% means, that in the considered polyamide (A4) exclusively isophthalic acid is used.

Polyamide (A4) preferably has a solution viscosity $\eta_{rel}$ measured according to DIN EN ISO 307:2013-08 on solutions of 0.5 g polymer in 100 mL m-cresol at a temperature of 20° C., of a maximum of 2.7, preferably a maximum of 2.3, especially a maximum of 2.0. Polyamides (A4) having a solution viscosity $\eta_{rel}$ in the range from 1.5 to 2.3, especially in the range from 1.6-2.0 are preferably preferred.

Component (B)—Fluorene Compound

The polyamide composition contains component (B) in an amount of 0.5 to 15% by weight, preferably in the range of 0.8 to 10% by weight and most preferred in the range of 1.0 to 7.0% by weight, related to the sum of the components A to E. Component (B) derives from the chemical substance fluorene or 9H-fluorene with the IUPAC designation tricyclo [7.4.0.0$^{2,7}$]trideca-2,4,6,9,11,13-hexane, with the chemical formula $C_{13}H_{10}$.

Preferably the melting point of (B) is lower than melting point of the thermoplastic resin (A) used for a matrix.

The fluorene compounds (B) preferably have the chemical structure of formula 1, whereby at least one of the substituents R1, R2, R3 and R4 is not a hydrogen atom. It is preferred that at least two of the substituents are different to hydrogen atoms. The substituents R3 and R4 can replace one or more of the four hydrogen atoms in the respective six-membered ring. Preferably R3 and R4 are hydrogen atoms.

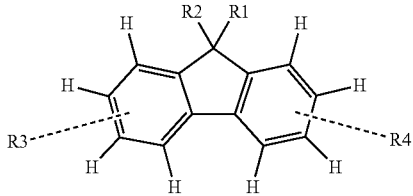

Formula 1

Especially R1 and R2 are same or different and R3 and R4 are hydrogen atoms. Especially R1 and R2 are same.

Preferably R1 and R2 are selected from the group consisting of hydroxyphenyls, such as 2- hydroxyphenyl, 3-hydroxyphenyl, 4-hydroxyphenyl, phenoxyalkanols, such as 4-phenoxy-ethanol, 4-phenoxy-propanol, 4-phenoxy-isopropanol, C1-C4-alkyl hydroxyphenyls, such as 4-hydroxy-3-methylphenyl, 3-hydroxy-2-methylphenyl, 4-hydroxy-2,6-dimethylphenyl, 4-hydroxy-3,5-dimethylphenyl, 4-hydroxy-3,5-di-t-butyl-phenyl, dihydroxyphenyls, such as 3,4-dihydroxy phenyl, 2,4-dihydroxyphenyl, 2,5-dihydroxy phenyl, 3,4-dihydroxy-5-methylphenyl, 3,4-dihydroxy-6-methylphenyl, 2,4-dihydroxy-3,6-dimethylphenyl, 2,4,6-trihydroxyphenyl, trihydroxyphenyls, such as 2,3,5-trihydroxyphenyl, 2,4,5-trihydroxyphenyl, 3,4,5-trihydroxyphenyl, 2,3,4-trihydroxyphenyl, 2,3,6-trihydroxyphenyl, monoglycidyloxyphenyls, such as 4-glycidyloxyphenyl, 4-glycidyloxy-3-methylphenyl, diglycidyloxyphenyls, such as 3,4-di-(glycidyloxy) phenyl, triglycidyloxyphenyls, such as 3,4,5-tri-(glycidyloxy)-phenyl, glycidyloxyalkoxyphenyls, such as monoglycidyloxy alkoxy phenyl, 4-glycidyloxyethoxyphenyl, 4-glycidyloxy ethoxy-3-methylphenyl, aminophenyls, such as 4-aminophenyl, 4-amino-3-methylphenyl, 3-amino-2-methylphenyl, 4-amino-3,5-dimethylphenyl, or 4-amino-3,5-di-t-butyl-phenyl, 4-amino-2,6-dimethylphenyl, or hydroxy.

Furthermore it is preferred if R3 and R4 are hydrogen. Examples for such fluorene compounds (B) which can be used by this invention, are:

9,9-bis (hydroxyphenyl)fluorenes, such as 9,9-bis (2-hydroxyphenyl)fluorene, 9,9-bis (3-hydroxyphenyl)fluorene, 9,9-bis (4-hydroxyphenyl)fluorene (bis-phenol fluorene, BPF), 9,9-bis (phenoxyalkanol) fluorenes, such as 9,9-bis (4-phenoxy-ethanol) fluorene, 9,9-bis (4-phenoxy-propanol) fluorene, 9,9-bis (4-phenoxy-isopropanol) fluorene, 9,9-bis (C1-C4-alkyl hydroxyphenyl) fluorenes, such as 9,9-bis (4-hydroxy-3-methylphenyl) fluorene, (bis-cresol fluorene, BCF), 9,9-bis (3-hydroxy-2-methylphenyl) fluorene, 9,9-bis (4-hydroxy-2,6-dimethylphenyl) fluorene, 9,9-bis (4-hydroxy-3,5-dimethylphenyl) fluorene, 9,9-bis (4-hydroxy-3,5-di-t-butyl-phenyl) fluorene, 9,9-bis (dihydroxyphenyl) fluorenes, such as 9,9-bis (3,4-dihydroxy phenyl) fluorene (bis-catechol fluorene, BCAF), 9,9-bis (2,4-dihydroxyphenyl) fluorene, 9,9-bis (2,5-dihydroxy phenyl) fluorene, 9,9-bis (3,4-dihydroxy-5-methylphenyl) fluorene, 9,9-bis (3,4-dihydroxy-6-methylphenyl) fluorene, 9,9-bis (2,4-dihydroxy-3,6-dimethylphenyl) fluorene.

9,9-bis (trihydroxyphenyl) fluorenes, such as 9,9-bis (2,4,6-trihydroxyphenyl) fluorene, 9,9-bis (2,3,5-trihydroxyphenyl) fluorene, 9,9-bis (2,4,5-trihydroxyphenyl) fluorene, 9,9-bis (3,4,5-trihydroxyphenyl) fluorene, 9,9-bis (2,3,4-trihydroxyphenyl) fluorene, 9,9-bis (2,3,6-trihydroxyphenyl) fluorene, 9,9-bis (monoglycidyloxyphenyl) fluorenes, such as 9,9-bis (4-glycidyloxyphenyl) fluorene (BPFG) and 9,9-bis (4-glycidyloxy-3-methylphenyl) fluorene (BCFG), 9,9-bis (diglycidyloxyphenyl) fluorenes, such as 9,9-bis [3,4-di-(glycidyloxy) phenyl] fluorene (bis-catechol fluorene tetraglycidyl ether), 9,9-bis (triglycidyloxyphenyl) fluorenes, such as the 9,9-bis [3,4,5-tri-(glycidyloxy)-phenyl] fluorene, 9,9-bis (glycidyloxyalkoxyphenyl) fluorenes, such as 9,9-bis (monoglycidyloxy alkoxy phenyl) fluorene, 9,9-bis (4-glycidyloxyethoxyphenyl) fluorene, (bis-phenoxy ethanol fluorene diglycidyl ether, BPEFG), 9,9-bis (4-glycidyloxy ethoxy-3-methylphenyl) fluorene (BCEFG), 9,9-bis (4-aminophenyl) fluorenes, such as 9,9-bis (4-aminophenyl) fluorene, (bis-aniline fluorene), 9,9-bis (4-amino-3-methylphenyl) fluorene, 9,9-bis (3-amino-2-methylphenyl) fluorene, 9,9-bis (4-amino-3,5-dimethylphenyl)

fluorene, 9,9-bis (4-amino-3,5-di-t-butyl-phenyl) fluorene, 9,9-bis (4-amino-2,6-dimethylphenyl) fluorene
9,9-bis hydroxy fluorene and
mixtures and combinations thereof.

Preferably used are the following fluorene compounds: Bis-phenoxy ethanol fluorene (BPEF), bisphenol fluorene (BPF), 9,9-bis (mono-glycidyloxyphenyl) fluorene, such as 9,9-bis (4-glycidyloxy-phenyl) fluorene (BPFG) and 9,9-bis (4-glycidyloxy-3-methylphenyl) fluorene (BCFG), 9,9-bis (di-glycidyloxy-phenyl) fluorene, such as 9,9-bis [3,4-di (glycidyloxy) phenyl] fluorene (bis-catechol fluorene tetraglycidyl ether), 9,9-bis (tri-glycidyloxy-phenyl) fluorene, such as 9,9-bis [3,4,5-tri-(glycidyloxy) phenyl] fluorene, 9,9-bis (glycidyloxy-alkoxyphenyl) fluorene, such as 9,9-bis (monoglycidyloxy-alkoxyphenyl) fluorene, such as 9,9-bis (4-glycidyloxy-ethoxyphenyl) fluorene (bis-phenoxy ethanol fluorene diglycidyl ether (BPEFG)), 9,9-bis (4-glycidyloxyethoxy-3-methylphenyl) fluorene (BCEFG).

Most preferred are bis-phenoxy-ethanol-fluorene (BPEF), available under the brand name Ogsol MF-11 from Osaka Gas Chemical Co. Ltd. (formula 2) and bisphenol-fluorene (BPF), available under the brand name Ogsol MF-12 (formula 3).

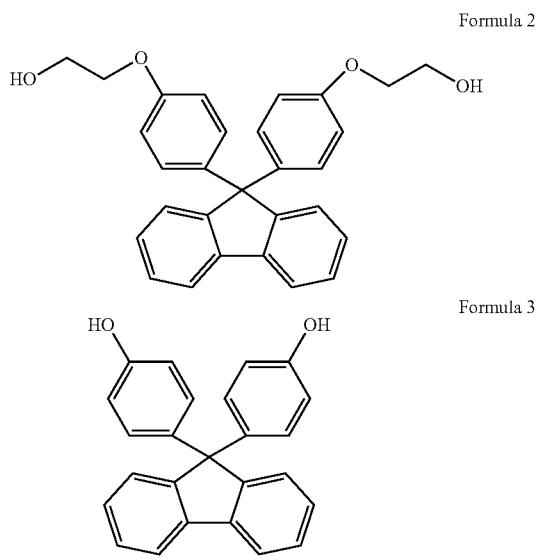

Formula 2

Formula 3

Component (C)—Azine Compound

Azine compounds are commercial products and e.g. described in H. Bernetz, Azine Dyes, Ullmann's Encyclopedia of Industrial Chemistry (DOI 10.1002/14356007.a03_213.pub3). Preferred azine compounds are e.g. nigrosines and indulines, wherein nigrosines are especially preferred. For the purposes of the present invention as far as azine compounds are concerned reference is made to the aforementioned textbook.

The inventive moulding compositions comprise, as component (C), from 0.2 to 3.0% by weight, preferably from 0.3 to 2.0% by weight, and in particular from 0.4 to 1.5% by weight, of an azine compound, especially nigrosine.

Synthesis of the nigrosine dye can be achieved by, for example, oxidizing and dehydrate-condensing aniline, aniline hydrochloride and nitrobenzene by heating them in the presence of metallic iron or copper and metal salts like iron chloride ($FeCl_3$) at a reaction temperature of 160 to 180° C. Nigrosine is produced as a mixture of various different compounds depending on reaction conditions, raw materials charged, charge ratio and the like; for example, it is postulated that nigrosine may be a mixture of various triphenazineoxazines and phenazineazine compounds.

Component (C) can be used in the form of free base or else in the form of salt (e.g. hydrochloride).

As the nigrosine (component (C)) of the present invention, the black azine-series mixture described as C.I. Acid Black 2, C.I. SOLVENT BLACK 5, C.I. SOLVENT BLACK 5:1, C.I. SOLVENT BLACK 5:2 and C.I. SOLVENT BLACK 7 in the COLOR INDEX can be suitably used (in this specification, C.I. Generic Names are described according to the third edition of the COLOUR INDEX).

Examples of commercially available nigrosine dyes include Spirit Black SB, Spirit Black SSBB, Spirit Black AB (all are categorized under C.I. SOLVENT BLACK 5); Nigrosine Base SA, Nigrosine Base SAP, Nigrosine Base SAP-L, Nigrosine Base EE, Nigrosine Base EE-L, Nigrosine Base EX, Nigrosine Base EX-BP (all are categorized under C.I. SOLVENT BLACK 7) and the like [all are products by Orient Chemical Industries, Ltd.].

It is preferably used C. I. SOLVENT BLACK 7 (CAS No 8005-02-5).

A volume average particle size (median particle diameter) X50 according to ISO 13320:2009 of the azine, especially the nigrosine as component (C) is preferably ranging from 5 to 20 microns, and it is furthermore preferably ranging from 5 to 15 microns. When the above nigrosine is used in the present invention, the assist injection moulding procedure is easily performed and hollow articles with reduced roughness of the inner surface are prepared.

In particular the component (C), especially the nigrosine can be introduced into the inventive moulding composition as masterbatch or concentrate, preferably on base of polyamides (A), preferably polyamides (A1) whereby the content of the azine component (C), e.g. nigrosine is preferably in the range of 20 to 40 wt.-%. As base of these masterbatches the aliphatic polyamides PA6, PA66, PA6/12 or mixtures thereof are preferred.

Concentration of iron in the azine component (C), e.g. nigrosine is for example less than 1 weight %, preferably less than 0.5 weight %, furthermore preferably less than 0.4 weight %. This improves dispersibility or compatibility of nigrosine as color for the resin and therefore the quality of assisted injection moulded articles made from the resin.

Concentration of aniline in the azine component (C), e.g. nigrosine is for example less than 1 weight %, preferably less than 0.5 weight %, furthermore preferably not more than 0.4 weight %.

Component (D)—Fillers

In a preferred embodiment, the moulding composition comprises the at least one filler (D), selected from fibrous fillers (D1) or particulate fillers (D2), in an amount of 15 to 65% by weight, more preferably 20 to 60% by weight, more preferably 25 to 55% by weight, in each case in relation to the sum of the components (A) to (E).

Component (D1)—Fibers

The fiber reinforcing agent (component (D1)) is preferably comprised in an amount of 0 to 70% by weight, more preferably in an amount of 15 to 65 or 20 to 60% by weight and in particular preferred in an amount of 25-55% by weight, each in relation to the sum of the components (A) to (E). Component D1 can be present as only filler.

According to another preferred embodiment of the proposed polyamide composition, reinforcing agents of component (D1) are fibers, in particular glass and/or carbon fibers, where short fibers, preferably with a length in the range of 2-50 mm and/or endless fibers (rovings), each with a diameter of 5-40 microns, are preferably used and where in particular fibers having a circular and/or noncircular cross section are used, where in the latter case the cross-sectional aspect ratio (long axis of cross section to secondary axis) is in particular >2.

Glass fibers having a noncircular cross section and a cross-sectional aspect ratio greater than 2, preferably 3-8, especially 3-5, are preferably used. These so-called flat glass fibers have an oval, elliptical, elliptical with constrictions (so-called "cocoon" [or "peanut"] fiber), rectangular, or nearly rectangular cross-sectional area.

The flat glass fibers in accordance with the invention that have a noncircular cross-sectional area are preferably used as short glass fibers (chopped strands; cut glass with a length of 0.1-50 mm, preferably 0.2-20 mm, more preferably 2-12 mm).

Another preferred characteristic of the flat glass fibers that are used is that the length of the main (long) cross-sectional axis lies preferably in the range of 6-40 microns, especially in the range of 15-30 microns, and the length of the secondary cross-sectional axis lies in the range of 3-20 microns, especially in the range of 4-10 microns. Mixtures of glass fibers with circular and noncircular cross sections can also be used to strengthen the moulding compounds in accordance with the invention, where the amount of flat glass fibers as defined above is preferably predominant, i.e., more than 50 wt.-% of the total weight of the fibers.

Especially preferred are the so-called flat glass fibers with a cross-sectional aspect ratio of 3-5. In particular, E glass fibers are used in accordance with the invention. However, all other types of glass fibers such as A, C, D, M, S and R glass fibers or any mixtures thereof or mixtures with E glass fibers can be used.

In the case of moulding compounds reinforced with endless fibers having circular cross-section (rovings), higher toughness result and thus properties that are still more metal-like properties result if, instead of the conventional endless glass fibers having diameters of 15-19 microns, ones with diameters of 10-14 microns, especially ones with diameters of 10-12 microns are used.

The polyamide moulding compounds in accordance with the invention can be prepared by the known methods for preparation of long fiber-reinforced rod-shaped pellets, in particular by pultrusion processes, in which the endless fiber strand (roving) is thoroughly soaked with the polymer melt and then chilled and chopped.

The long fiber-reinforced rod-shaped pellets obtained in this way, which preferably have a pellet length of 3-25 mm, especially 4-12 mm, can be further processed into moulded objects using the conventional processing methods such as injection moulding or pressing.

The endless carbon fibers used in the pultrusion process have a diameter of 5-10 microns, preferably 6-8 microns. To improve matrix binding and fiber handling, the fibers can be coated with chemically different layers, as are known in the prior art for glass and carbon fibers.

The glass fibers themselves, independent of the shape of the cross-sectional surface and length of the fibers, can be chosen from the group consisting of E glass fibers, A glass fibers, C glass fibers, D glass fibers, M glass fibers, S glass fibers, and/or R glass fibers, where E glass fibers are preferred.

Component (D2)—Particulate Fillers

The particulate fillers (component (D2)) are preferably comprised in an amount of 0 to 30% by weight, more preferably in an amount of 0 to 20% by weight and in particular preferred in an amount of 0-10% by weight, each in relation to the sum of the components (A) to (E).

Particulate filler material for component (D2) is comprised of filler material familiar to professionals for this function. This includes, in particular, particulate filler material selected from the group consisting of: talc, mica, silicates, quartz, wollastonite, kaolin, silicic acids, magnesium carbonate, magnesium hydroxide, chalk, ground or cut calcium carbonate, lime, feldspar, anorganic pigments, such as barium sulfate, zinc oxide, zinc sulfide, titanium dioxide, ferric oxide, ferric manganese oxide, metal oxides, especially spinels, such as for example copper ferric spinel, copper chromium oxide, zinc ferric oxide, cobalt-chromium oxide, cobaltaluminium oxide, magnesium aluminium oxide, copper-chromiummanganese-compound copper-manganese-iron-compound oxide, rutile pigments such as titanium-zinc-rutile, nickel-antimonytitanate, permanent magnetic or magnetisable metals or alloys, concave silicate filler material, aluminium oxide, boron nitride, boron carbide, aluminium nitride, calcium fluoride, and compounds thereof. The filler materials can also have treated surfaces.

Component (D2) preferably has an average particle size X50 according to ISO 13320:2009 of 0.1- 40 μm, preferably 0.2-20 μm, and especially 0.3-10 μm.

Component (E)—Additives

In a preferred embodiment, the moulding composition comprises the at least one additive (E) in an amount of 0 to 10% by weight, more preferably 0.2 to 10% by weight and more preferably 0.3 or 0.4 to 9.0% by weight, each in relation to the sum of the components (A) to (E).

Component (E1)—Heat Stabilizer

The thermoplastic moulding compounds in accordance with the invention contain as component (E1), 0-3.0% by weight, preferably 0.2-2.0% by weight, especially preferably 0.2-1.5 wt.-%, especially preferred 0.3 to 1.0% by weight, in each case in relationship to the sum of (A) to (E), of at least one heat stabilizer or thermos-stabilizer which preferably is selected from the group consisting of compounds of mono- or divalent copper, stabilizers based on secondary aromatic amines, stabilizers based on sterically hindered phenols, phosphites, phosphonites, metal salts or metal oxides, whereby in particular the metal is copper and mixtures of the above-mentioned stabilizers.

In a preferred embodiment the thermal stabilizers (component (E)) are chosen from the group consisting of
compounds of mono- and divalent copper, for example salts of mono- or divalent copper with inorganic or organic acids or a mono- or dihydric phenol, the oxides of mono- or divalent copper, or the complex compounds of copper salts with ammonia, amines, amides, lactams, cyanides or phosphines, preferably Cu(I) or Cu(II) salts of the halohydric acids, cyanohydric acids or the copper salts of aliphatic carboxylic acids. The monovalent copper compounds CuCl, CuBr, CuI, CuCN and $Cu_2O$, as well as the divalent copper compounds $CuCl_2$, $CuSO_4$, CuO, copper(II) acetate or copper(II) stearate are especially preferred. The copper compound can be used as such as or in the form of concentrates. A concentrate is understood to mean a polymer, preferably of the same chemical nature as component (A) or (B), that contains the copper salt in a high concentration. The copper compounds are advantageously used in combination with other metal halides, especially alkali halides like NaI, KI, NaBr, KBr, where the mole ratio of metal halide to copper halide is 0.5-20, preferably 1-10, and especially preferably 3-7;

stabilizers based on secondary aromatic amines;
stabilizers based on sterically hindered phenols;
metal salts or metal oxides, especially originating from transition metals, whereby iron salts or iron oxides are preferred,
phosphites and phosphonites; and also
mixtures of the stabilizers indicated above.

Especially preferred examples of stabilizers based on secondary aromatic amines that can be used in accordance with the invention are adducts of phenylenediamine with acetone (Naugard A), adducts of phenylenediamine with linolene, Naugard 445, N,N'-dinaphthyl-p-phenylenediamine, N-phenyl-N'-cyclohexyl-p-phenylenediamine or mixtures of two or more thereof.

Preferred examples of stabilizers based on sterically hindered phenols that can be used in accordance with the invention are N,N'-hexamethylenebis-3-(3,5-di-tert-butyl-4-hydroxyphenyl)propionamide,bis(3,3-bis(4'-hydroxy-3'-tert-butylphenyl)butanoic acid) glycol ester, 2,1'-thioethyl-bis-(3-(3,5-di-tert-butyl-4-hydroxyphenyl)propionate, 4,4'-butylidenebis(3-methyl-6-tert-butylphenol), triethylene glycol-3-(3-tert-butyl-4-hydroxy-5-methylphenyl)propionate, or mixtures of two or more of these stabilizers.

Preferred phosphites and phosphonites are triphenyl phosphite, diphenylalkyl phosphite, phenyl dialkyl phosphite, tris(nonylphenyl)phosphite, trilauryl phosphite, trioctadecyl phosphite distearylpentaerythritol diphosphite, tris(2,4-di-tert-butylphenyl) phosphite, diisodecylpentaerythritol diphosphite, bis(2,4-di-tert-butylphenyl)pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)) pentaerythritol diphosphite, tristearyl sorbitol triphosphite, tetrakis(2,4-di-tert-butylphenyl)-4,4'-biphenylene diphosphonite, 6-isooctyloxy-2,4,8,10-tetra-tert-butyl-12H-dibenz[d,g]-1,3,2-dioxaphosphocine, 6-fluoro-2,4,8,10-tetra-tert-butyl-12-methyldibenz[d,g]-1,3,2-dioxaphosphocine, bis(2,4-di-tert-butyl-6-methylphenyl)methyl phosphite and bis(2,4-di-tert-butyl-6-methylphenyl)ethyl phosphite. Especially preferred are tris[2-tert-butyl-4-thio-(2'-methyl-4'-hydroxy-5'-tertbutyl)phenyl-5-methyl) phenyl phosphite and tris(2,4-di-tert-butylphenyl)phosphite (Hostanox® PAR24, commercial product of Clariant, Basel).

An especially preferred embodiment of the thermostabilizer consists of the combination of organic heat stabilizers (in particular, Hostanox PAR 24 and Irganox 1010), a bisphenol A-based epoxide (in particular, Epikote 1001), and a copper stabilizer based on CuI (copper iodide) and KI (potassium iodide). Thermal stabilization exclusively on the basis of CuI and KI is especially preferred.

Besides the addition of organic heat stabilizers and/or copper or copper compounds, the use of other transition metal compounds, especially metal salts or metal oxides of groups VB, VIIB, VIIB or VIIIB of the periodic table, is preferably excluded. Moreover, preferably no transition metals of the groups VB, VIIB, VIIB or VIIIB of the periodic table such as iron or steel powders, are added to the moulding compound in accordance with the invention.

Component (E2)—Further Additives, Different from Components A to D and E1

It is further preferred that the polyamide composition comprises 0-12% by weight of at least one additive, different to any of the components A to E1, which is selected from the group consisting of UV- and light-stabilizers, lubricants, processing aids, coloring- and marking materials, organic pigments, IR absorbers, antistatic agents, antiblocking agents, crystal-growth inhibitors, nucleation agents, condensation catalysts, chain extenders, defoamers, chain-lengthening additives, conductivity additives, such as carbon black, graphite, carbon nanotubes, graphene, mould-release agents, separating agents, flame retardants, non-halogen-containing flame retardants, anti-dripping-agents, impact modifiers, in particular in form of maleic anhydride, acrylic acid or methacrylic acid modified polyolefins, optical brighteners, photochromic additives, metallic pigments.

The at least one additive (E2) is preferably comprised in an amount of 0 to 12 or 0 to 8.0% by weight, more preferably 0 or 0.1 to 7.5% by weight, in each case in relation to the sum of (A) to (E).

Most preferred is a polyamide composition which consists of the following components:
(A) 30.0 to 88.4% by weight of a partially crystalline aliphatic polyamide,
(B) 1.0 to 10.0% by weight of at least one fluorene compound
(C) 0.4 to 1.5% by weight of at least one azine compound, especially at least one nigrosine,
(D) 10 to 68.4% by weight of fillers (D1) and (D2)
    (D1) 10 to 60% by weight of glass fibers
    (D2) 0 to 30% by weight of a at least one particulate filler,
(E) 0.2 to 10.0% by weight of at least one additive
    (E1) 0.2 to 2.0% by weight of at least one heat stabilizer
    (E2) 0 to 8.0% by weight of at least one further additive
whereby the entirety of components (A) to (E) add up to 100% by weight and whereby each given concentration range is related to the sum of (A) to (E).

Moreover, the present invention provides a method for the production of a moulded article as well as a moulded article which is producible from the above-described moulding composition. Such moulded article as well as structural hybrid parts comprising a metal component is manufactured by extrusion, extrusion blow moulding or injection moulding, preferably by an injection overmoulding process.

In particular the moulded articles of the present invention include metal- polyamide assemblies in particular for lightweight construction, whereby a reliable connection between metals and polyamide based compositions are demanded. These can be used in particular in the automotive field e.g. for parts like pedals, e.g. accelerator or brake pedal, oil pan for transmission, plastic gear-wheel with metal shaft or sleeve for steering systems, plastic throttle valve with metal shaft, decorative strips or profiles, carrier for instrument panels, dashboard trim panels, connectors, holding structures and arms, baffle ripping, vehicle lighting, vehicle sensors, cruise control system, distance sensor, power steering assist etc., or in the electric or electronic field e.g. for parts, e.g. mobile phone housings or assemblies, drive wheels bonded to metal shafts for conveying paper in a printer, connectors, coated wire and metal conductors, air bag igniter, mirror adjustment etc.

The described polyamide compositions are especially prone for the following applications with regard to the manufacturing of metal-polyamide assemblies: Injection of functional plastic elements or of mechanical plastic reinforcements onto metal bodies or sheets, injection-molding around metallic inserts, back-injection, in-mold lamination and coating of metal profils or sheets.

Surprisingly it could be demonstrated that the structural parts according to the invention have
excellent bonding strength between the metal and the thermoplastic component, in terms of tensile lap-shear strength according to ISO 19095, the thermoplastic component has excellent surface properties (i.e. a very smooth surface;
the thermoplastic component has excellent long-term heat resistance;
good mechanical properties;
a low weight.

To produce the polyamide moulding composition the components (A) to (E) were compounded on typical compounding machines, e.g. single- or twin-screw extruders or screw kneaders. The dried component (A), (B), (D) and (E) will be preferably metered via a gravimetric metering scale into the intake. Component (D1) can be metered via a gravimetric metering scale into the intake or via a side feeder into the molten component (A). Components (A), (B), (D) and (E) can also be metered into the intake in form of dry blends. (B) and/or (C) can also be used in form of a concentrate (masterbatch), preferably on base of polyamides (A), more preferably on base of polyamides (A1).

The compounding is performed at set cylinder temperatures of preferably 70 to 100° C. for the first cylinder and depending on the nature of component (A) 280 to 370° C. for the remaining cylinders. Vacuum can be applied or degassing can be performed to the atmosphere before the nozzle. The melt is extruded in strand form, cooled down in a water bath at 10 to 90° C. and subsequently pelletized. The pellets are dried for 12 to 24 hours at 80 to 120° C. under nitrogen or in vacuum to a water content of less than 0.1 wt.-%.

The present invention furthermore relates to a multilayer structure (or structural part) comprising a substrate as well as at least one layer made of a thermoplastic component consisting of or comprising the polyamide composition according to the present invention as described above in greater detail. The thermoplastic component is in direct contact with the substrate.

The present invention therefore additionally relates to the polyamide moulding composition with improved adhesion to metals according to the invention (as sole part or one part of a thermoplastic component) is directly bonded to a structural part (substrate), comprising e.g. a metal component. The thermoplastic component consisting of or comprising the polyamide moulding composition according to the invention and the substrate are a directly bonded together, a separate bonding agent system, adhesive layer or a primer is not required.

The thermoplastic component comprises the polyamide composition according to the invention or consists entirely of the polyamide moulding composition. Besides the polyamides (A) present in the polyamide moulding composition the thermoplastic component preferably comprises further polymers, in particular, which may likewise be provided in the form of a mixture with the polyamide component (A). The further polymers—if present—preferably are preferably selected from the group consisting of: polycarbonate, polystyrene, polymethylmethacrylate, acrylonitrile butadiene, styrene copolymer, acrylonitrile styrene copolymer, polyolefin, polyoxymethylene, polyester, in particular polyethylene terephthalate, polybutylene terephthalate, polysulfone (in particular of the PSU, PESU, PPSU type), polyphenylene ether, polyphenylene sulfide, polyphenylene oxide, liquid-crystalline polymers, polyether ketone, polyether ether ketone, polyimide, polyamide imide, polyester imide, polyether amide, polyester amide, polyether ester amide, polyurethane (in particular of the TPU, PUR type), polysiloxane, polyacrylate, polymethacrylate and mixtures or copolymers based on such systems.

The substrate especially is a metal component. Basically all metals can be used, in particular those metals common in the field of structural parts, such as steel (which can exhibit different types of strength), high-grade steel, tin, light metals, such as aluminium and magnesium, etc., or a metal alloy, e.g. with carbon, chromium, nickel and molybdenum.

The metals are preferably aluminium, steel or stainless steel that is free from coatings or lubricants. The metal component is typically employed in the form of sheet metal or sheet metal formed to shaped parts.

Furthermore, the present invention relates to a first method of producing a multilayer structure as described in the foregoing. The multilayer structure (or structural part) according to the invention can be obtained according to a method comprising the following steps:
a) providing a substrate, e.g. a metal component,
b) introducing the substrate, e.g. the metal component into an injection mold,
c) injection moulding a thermoplastic component, consisting of or comprising the inventive polyamide composition as described in greater detail in the foregoing, onto or around the substrate, e.g. the metal component, wherein the metal component has a temperature in the range of 80 to 200° C., preferably 100-160° C.
d) demolding the metal-thermoplastic component assembly after cooling.

During the phase c) the thermoplastic molding composition or polyamide composition is preferably injected with a speed of 50-200 mm/s, more preferably with a speed of 60-150 mm/s and especially with a speed of 100-150 mm/s into the mold, whereby the mold temperature (tool temperature) is preferably 100-160° C., more preferably 120-150° C. and in particular 130-145° C. The holding pressure is preferably in the range of 40-150 MPa, more preferably 60-120 MPa and in particular 70-100 MPa.

According to a second method according to the invention the above described multilayer structure can be produced in a post molding assembly. This method comprises or consists of the following steps:
a) providing a substrate, e.g. a metal component,
b) providing at least one moulded part made of a polyamide moulding composition according to the invention and as discussed in the foregoing,
c) heating the substrate and/or the at least one moulded part at least in the regions in which a permanent contact between the substrate and the at least one moulded part is to be established to a temperature at which the polyamide moulding composition becomes thermoelastic or thermoplastic,
d) contacting the substrate with the at least one moulded part.

Preferably, step d) is carried out under pressure, i.e. pressing the at least one moulded part made of the polyamide moulding composition according to the invention against the substrate. Preferably, the substrate and/or the at least one moulded part are maintained at the temperatures of step c) during step d).

Moreover, the present invention relates to a third method for producing a layer structure, as set out above, which is characterized in that at least a part of the surface of a substrate such as a metal element is coated with a layer made form the polyamide composition according to the invention. Preferably the coating can be done in an extrusion process, preferably around the entire circumference of the substrate (such as a metal element). Preferably the substrate can be in the form of a continuous profile, more particularly in the form of a wire with circular or flat cross section, a flat conductor or a tube, preferably by the continuous profile, supplied from a roll, being passed jointly through an extrusion die with the material of the polyamide layer. Prior to extrusion coating, the adhesion of the metal element to the polyamide layer is improved preferably by means of cleaning baths, which may comprise solvents and/or acidic or alkaline aqueous solutions, and is cleaned and degreased, and subsequently dried and preheated to a temperature in the range from 130 to 250° C., preferably 150 to 230° C., especially preferably to 170 to 220° C. This heating of the metal element is accomplished preferably using hot air, flaming or microwaves (high-frequency preheating).

EXAMPLES

The present invention is described in more detail by the following examples.

The following measuring specifications were used to analyse the polyamides and test the polyamide moulding compounds. If not noted elsewhere the test pieces were analyzed dry as moulded.

Relative Viscosity (RV or $\eta_{rel}$, Both Terms are Interchangeably Used):
ISO 307:2013-08
Pellets
0.5 g in 100 ml m-cresol
Temperature 20° C.
Calculation of the relative viscosity according to $RV=t/t_0$
Glass Transition Temperature, Melting Point, Melting Enthalpy (Heat of Fusion):
ISO 11357-1/-2/-3 (2013-04)
Pellets Differential scanning calorimetry (DSC) was performed at a heating rate of 20 K/min. For the melting point, the temperature was specified at the peak maximum.
Tensile Lap-Shear Strength
ISO 19095-1, -2, -3 (2015-08)
Tensile lap-shear strength was determined according to article 5.2 of the $3^{rd}$ part of ISO 19095 with a test speed of 10 mm/min at a temperature of 23° C.

Overlapped test specimens (type B), dimensions and arrangement as described in article 4.2 of the $2^{nd}$ part of ISO 19095
Conditioning: 48 h at 23° C./50% rH
Metal substrate: aluminium degreased
Production of Moulding Compositions The moulding compositions having the compositions in Tables 2 were produced on a twin-screw extruder from Toshiba Machine Co., Ltd. Modell TEM-37BS. The components A, B, C and F were metered into the feed zone. The glass fibres (D1) were metered into the polymer melt by means of a side feeder 3 barrel units upstream of the die. The barrel temperature was set as rising profile up to 300° C. for the examples E1, E2 and comparison examples CE1-CE3 and up to 340° C. for the example E3 and comparison test CE4. A throughput of 10 kg/h was achieved at a revolution speed of 120 to 200 rpm. Degassing was performed to the atmosphere before the nozzle. The compounded materials were discharged as strand from a die of diameter 3 mm and pelletized after water cooling. After pelletizing and drying for 24 h at 110° C. in vacuum (30 mbar) to a water content of less than 0.1 wt.-%, the properties of the pellets were measured and the test samples were produced.

Production of Test Pieces

The test pieces for the tensile lap-shear strength test were produced on an injection moulding machine by the Arburg Company, Modell Allrounder 420 C 1000-250 with a mold designed for the manufacturing of the metal-polyamide-assemblies according to type B specimens of ISO 19095 (2015-08). For polyamide 6T/6I compounds increasing cylinder temperatures from 310° C. to 340° C. were thereby used. For polyamide 66 compounds increasing cylinder temperatures from 260° C. to 290° C. For all experiments the tool temperature was 145° C., the injection speed was 150 mm/s and the holding pressure was 100 MPa.

For the preparation of the polyamide moulding compositions the following materials were used (s. Table 1):

TABLE 1

| Components (A) to (E) | | | |
| --- | --- | --- | --- |
| Component | Description | Trade Name | Producer |
| PA 6 (A) | polyamide 6 made of caprolactam, RV = 1.62, melting point 222° C. | Grilon A23 | EMS Chemie AG, Switzerland |
| PA 66 (A) | polyamide 66 made of hexamethylendiamine and adipic acid, RV = 1.85, melting point 260° C. | Leona 1200 | Asahi Chemical Industry, Japan |
| PA 6T/6I (A) | polyamide 6T/6I (70/30 mol-%) made of hexamethylendiamine, terephthalic acid and isophthalic acid, RV = 1.56, melting point 325° C. | — | EMS-CHEMIEAG, Switzerland |
| Fluorene (B) | bis-phenoxy-ethanol-fluorene (BPEF) | Ogsol MF-11 | Osaka Gas Chemical Co. Ltd., Japan |
| Nigrosine (C) | C.I. SOLVENT BLACK 7 | Nubian Black TH-807 | Orient Chemical Industries Ltd. |
| glass fiber (D1) | Chopped glass fibers with a length of 3 mm and a diameter of 10 µm | CS3J-260 | Nitto Boseki Co., Ltd., Japan |
| CuI (E1) | copper (I) iodide, purity at least 98%, CAS-No. 7681-65-4 | — | Junsei Chemical Co., Ltd, Japan |
| KI (E1) | potassium iodide, purity at least 98%, CAS-No. 7681-11-0 | — | Junsei Chemical Co., Ltd, Japan |

TABLE 2

Examples Ex1-Ex3 according to the invention and Comparative Examples CEx1-CEx4

| Component | Unit | Ex1 | Ex2 | Ex3 | CEx1 | CEx2 | CEx3 | CEx4 |
|---|---|---|---|---|---|---|---|---|
| PA 66 | wt.-% | 62.4 | 46.8 | | 66.7 | 65.9 | 65.9 | |
| PA 6T/6I | wt.-% | | | 65.4 | | | | 69.7 |
| PA 6 | wt.-% | | 15.6 | | | | | |
| Fluorene | wt.-% | 3.5 | 3.0 | 3.5 | | 3.5 | | |
| Nigrosine | wt.-% | 0.8 | 1.3 | 0.8 | | | 0.8 | |
| Glass fibers | wt.-% | 33.0 | 33.0 | 30.0 | 33.0 | 33.0 | 33.0 | 30.0 |
| CuI | wt.-% | 0.05 | 0.05 | 0.05 | 0.05 | 0.05 | 0.05 | 0.05 |
| KI | wt.-% | 0.25 | 0.25 | 0.25 | 0.25 | 0.25 | 0.25 | 0.25 |
| Melted resin temperature | °C. | 290 | 285 | 335 | 290 | 290 | 290 | 335 |
| Tensile lap-shear strength Structure: Aluminium/PA Composition | MPa | 57.6 | 52.2 | 50.5 | 20.5 | 33.7 | 21.5 | 22.0 |

The comparison between the inventive examples Ex1 to Ex3 and the comparative examples CEx1 to CEx4 clearly indicates that polyamide compositions without the components (B) and (C) or compositions containing only (B) or (C) have a reduced adhesion to the metal substrates. Only polyamide compositions of the inventive examples that comprise both (B) and (C) enable multilayer structures comprising a metal substrate that have high tensile lap-shear strength.

The invention claimed is:

1. A multilayer structure comprising a substrate and at least one layer made of a thermoplastic component comprising a polyamide moulding composition, wherein the at least one layer made of a thermoplastic component is in direct contact with the substrate,
wherein the polyamide moulding composition consists of the following components:
   (A) 25 to 99.3% by weight of at least one polyamide;
   (B) 0.5 to 15% by weight of at least one fluorene compound;
   (C) 0.2 to 3.0% by weight of at least one azine compound;
   (D) 0 to 70% by weight of at least one filler; and
   (E) 0 to 15.0% by weight of at least one additive, different from (B), (C) and (D);
wherein the entirety of components (A) to (E) adds up to 100% by weight.

2. The multilayer structure according to claim 1, wherein each of the components (A) to (E) are present in the polyamide moulding composition in the following weight proportions:
   (A) 30.0 to 98.7% by weight of at least one polyamide;
   (B) 0.8 to 10.0% by weight of at least one fluorene compound;
   (C) 0.3 to 2.0% by weight of at least one azine compound;
   (D) 15.0 to 65.0% by weight of at least one filler; and
   (E) 0.2 to 10.0% by weight of at least one additive, different from (B), (C) and (D).

3. The multilayer structure according to claim 1, wherein the polyamide (A) is selected from the group consisting of
   (A1) partially crystalline aliphatic polyamides selected from the group consisting of PA 46, PA 56, PA 6, PA 66, PA 6/66, PA 69, PA 610, PA 612, PA 614, PA 1010, PA 1012, PA 1014, PA 1212, PA 11, PA 12, PA 6/12, PA MXD6, PA MXD10 and copolymers and mixtures thereof;

(A2) partially crystalline partially aromatic polyamides, selected from the group consisting of PA 4T/4I, PA 4T/6I, PA 5T/5I, PA 6T/6, PA 6T/6I, PA 6T/6I/6, PA 6T/6I/66, PA 6T/6I/610, PA 6T/6I/612, PA 6T/66, 6T/610, 6T/612, PA 6T/10T, PA 6T/10I, PA 9T, PA 9MT, PA 10T, PA 12T, PA 10T/10I, PA 10T/106, PA 10T/12, PA 10T/11, PA 6T/9T, PA 6T/12T, PA 6T/10T/6I, PA 6T/6I/6, PA 6T/6I/12, and mixtures thereof;

(A3) cycloaliphatic polyamides, selected from the group consisting of MACM9, MACM10, MACM11, MACM12, MACM13, MACM14, MACM16, MACM18, PACM9, PACM10, PACM11, PACM12, PACM13, PACM14, PACM16, PACM18, TMDC9, TMDC10, TMDC11, TMDC12, TMDC13, TMDC14, TMDC15, TMDC16, TMDC17, TMDC18, MACMI/12, MACMT/12, MACMI/MACMT/12, 6I/6T/MACMI/MACMT/12, 3-6T, 6I/MACMI/MACMT, 6I/PACMI/PACMT, 6I/6T/MACMI, MACMI/MACM36, 12/PACMI or 12/MACMT, 6/PACMT, 6/IPDT or mixtures thereof, MACM9-18/PACM9-18, MACM9-18/TMDC9-18, TMDC9-18/PACM9-18, and mixtures thereof;

(A4) amorphous partially aromatic polyamides, selected from the group consisting of PA 5I, PA 6I,PA DI, PA 5I/5T, PA DI/DT, PA 6T/6I, PA5I/5T/6I/6T, PA 5I/5T/DI/DT, PA6I/6T/DI/DT, PA 6I/10I, PA 10I/10T, PA MXDI, MXD6/MXDI and copolymers and mixtures thereof;

or mixtures of at least two of the aforementioned polyamides (A1) to (A4), optionally with at least one of the polyamides (A3) and (A4), wherein "M" represents methyloctanediamine, "3-6" in 3-6T represents 3-6=trimethylhexa-methylene-1,6-diamine, and "D" in DI represents 2-methyl-1,5-pentandiamine.

4. The multilayer structure according to claim 1, wherein the at least one fluorene compound (B) is selected from the compounds according to formula 1

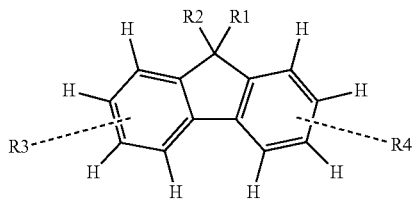

formula 1 wherein at least one of the substituents R1 and R2 is not hydrogen, wherein
R1 and/or R2 are selected from the group consisting of hydroxyphenyls, phenoxyalkanols, C1-C4-alkyl hydroxyphenyls, dihydroxyphenyls, trihydroxyphenyls, monoglycidyloxyphenyls, diglycidyloxyphenyls, triglycidyloxyphenyls, glycidyloxyalkoxyphenyls, aminophenyls, and hydroxy, and
R3 and R4 are hydrogen.

5. The multilayer structure according to claim 1, wherein the at least one fluorene compound (B) is selected from the group consisting of
9,9-bis(hydroxyphenyl)fluorenes, 9,9-bis(phenoxyalkanol)fluorenes,
9,9-bis(C1-C4-alkyl hydroxyphenyl)fluorenes,
9,9-bis(dihydroxyphenyl)fluorenes,
9,9-bis(trihydroxyphenyl)fluorenes,
9,9-bis(monoglycidyloxyphenyl)fluorenes,
9,9-bis(diglycidyloxyphenyl)fluorenes,
9,9-bis(triglycidyloxyphenyl)fluorenes,
9,9-bis(glycidyloxyalkoxyphenyl)fluorenes,
9,9-bis(4-aminophenyl)fluorenes,
9,9-bis-hydroxy-fluorene, and
mixtures and combinations thereof.

6. The multilayer structure according to claim 1, wherein the at least one azine compound is selected from the group consisting of nigrosines and indulines.

7. The multilayer structure according to claim 1, wherein the at least one azine compound is particulate with a volume average particle size X50 according to ISO 13320:2009 ranging from 5 to 20 microns.

8. The multilayer structure according to claim 1, wherein the at least one filler (D) is selected from the group consisting of (D1) fibers and (D2) particulate fillers.

9. The multilayer structure according to claim 1, wherein the at least one additive, different from (B), (C) and (D), is selected from the group consisting of
(E1) heat stabilizers and
(E2) UV- and light-stabilisers, lubricants, processing aids, coloring-and marking materials, organic pigments, IR absorbers, antistatic agents, antiblocking agents, crystal-growth inhibitors, nucleation agents, condensation catalysts, chain extenders, defoamers, chain-lengthening additives, conductivity additives, carbon black, graphite, carbon nanotubes, graphene, mould-release agents, separating agents, flame retardants, non-halogen-containing flame retardants, anti-dripping-agents, impact modifiers, optical brighteners, photochromic additives, metallic pigments and mixtures and combinations thereof.

10. The multilayer structure according to claim 1, wherein the polyamide moulding composition consists of the following components:
(A) 30.0 to 88.4% by weight of a partially crystalline aliphatic polyamide,
(B) 1.0 to 10.0% by weight of at least one fluorene compound,
(C) 0.4 to 1.5% by weight of at least one azine compound,
(D) 10.0 to 68.4% by weight of the following fillers
(D1) 10 to 60% by weight of glass fibers and
(D2) 0 to 30% by weight of at least one particulate filler,
(E) 0.2 to 10.0% by weight of at least one of the following additives
(E1) 0.2 to 2.0% by weight of at least one heat stabilizer, and
(E2) 0 to 8.0% by weight of at least one further additive, wherein the entirety of components (A) to (E) adds up to 100% by weight.

11. The multilayer structure according to claim 1, wherein the substrate is a metal substrate.

12. A method for the production of a multilayer structure according to claim 1, comprising the following steps:
a) providing a substrate,
b) introducing the substrate into an injection mold,
c) injection moulding a thermoplastic component comprising the polyamide moulding composition onto or around the substrate, wherein the metal component is at a temperature in the range of 80 to 200° C., and
d) demolding the metal-thermoplastic component assembly after cooling.

13. The method for the production of a multilayer structure according to claim 1, comprising the following steps:
a) providing a substrate,
b) providing at least one moulded part made of a polyamide moulding composition,
c) heating the substrate and/or the at least one moulded part at least in the regions in which a permanent contact between the substrate and the at least one moulded part is to be established to a temperature at which the polyamide moulding composition becomes thermoelastic or thermoplastic, and
d) contacting the substrate with the at least one moulded part.

14. The method for the production of a multilayer structure according to claim 1, comprising the following steps:
a) providing a substrate and
b) coating at least a part of a surface of the substrate with the polyamide moulding composition which is molten.

* * * * *